United States Patent [19]

Kato

[11] Patent Number: 4,896,560
[45] Date of Patent: Jan. 30, 1990

[54] INDEXING DEVICE

[75] Inventor: Heizaburou Kato, Ogasa, Japan

[73] Assignee: Sankyo Manufacturing Company, Ltd., Tokyo, Japan

[21] Appl. No.: 270,035

[22] Filed: Nov. 14, 1988

[30] Foreign Application Priority Data

Jun. 1, 1988 [JP] Japan .................. 63-132594
Jun. 1, 1988 [JP] Japan .................. 63-71748[U]

[51] Int. Cl.$^4$ ............................. F16H 53/06
[52] U.S. Cl. ........................ 74/569; 74/827
[58] Field of Search ............ 74/567, 569, 813 R, 74/827, 122, 63, 70, 125

[56] References Cited

U.S. PATENT DOCUMENTS

| | | | |
|---|---|---|---|
| 2,116,142 | 5/1938 | Chappell et al. | 74/569 X |
| 2,908,186 | 10/1959 | Meyer | 74/569 |
| 3,618,427 | 11/1971 | Schoepe | 74/827 X |
| 3,850,051 | 11/1974 | Woltjen et al. | 74/827 X |

FOREIGN PATENT DOCUMENTS 1433995 4/1976 United Kingdom ............... 74/569

Primary Examiner—Rodney M. Lindsey
Attorney, Agent, or Firm—Barnes & Thornburg

[57] ABSTRACT

An indexing device comprises a rotatably driven input shaft; a globoidal cam having, for the purpose of outputting intermittently the rotation of the input shaft, a taper rib defining a cam face which has a disk-shaped end face gradually yielding to a helical face about the input shaft; an output shaft to which the rotation of the input shaft is transmitted so that the output shaft may rotate intermittently; an indexing disk provided on the output shaft and having supports protruding radially outwardly at intervals along the circumference of the indexing disk, the ridge of the taper rib fitting between the adjoining supports; cam followers each disposed at the end of the support on the indexing disk and brought into engagement with the taper rib so as to be intermittently driven along the cam face; and gaps provided between the ridge of the taper rib and the supports opposite this, the gap being filled up by the elastic deformation of the cam follower so that the ridge of the taper rib may come into contact with the support. Thus, even though an excessive load is applied to the input shaft, etc., the generation of permanent deformation such as an imprint can be prevented, which will result in improvements in rigidity and durability of the indexing device, therefore improvement in reliability of the indexing device for a machine tool to which the indexing device of the present invention is applied.

9 Claims, 7 Drawing Sheets

INDEXING DEVICE

BACKGROUND OF THE INVENTION

1. Field of the Invention

The present invention relates to an indexing device for turret lathes and other machine tools, and more particularly to an indexing device which produces a prescribed intermittent motion of an output shaft by engagement between the taper rib of a globoidal cam and a cam follower fixed on the indexing device.

2. Description of the Prior Art

Machines such as a turret lathe comprise an indexing device to which are fastened, in advance, a variety of cutting tools necessary for successive machining processes, and which during machining is suitably rotated so that the cutting tools may be brought sequentially into cutting position for required processing. Some known indexing devices of this type utilize a globoidal cam.

Generally, in the indexing device having the globoidal cam, a plurality of cam followers are fixed radially at suitable intervals along the outer periphery of the indexing disk integral with the output shaft, and these cam followers sequentially engage with the taper rib on the globoidal cam which is integral with the input shaft. The two cam followers immediately adjoining the cam follower in engagement with the cam abut against the right and left lateral sides of the taper rib respectively so that no backlash occurs between the globoidal cam and the cam followers; that is to say, this cam is a positive motion cam.

The taper rib of the globoidal cam defines an index portion in which it undergoes a displacement in the direction of the input shaft in response to an angle of rotation of the input shaft, and a dwell portion in which it undergoes no displacement in the direction of the input shaft in response to the rotation of the input shaft; and these portions are determined so that the desired cam profile can be obtained. Accordingly, when the cam follower is in engagement with the index portion, the output shaft rotates a predetermined angle in response to the rotation of the input shaft so that one of the cutting tools may be brought into cutting position; and when in engagement with the dwell portion, the output shaft does not rotate despite the rotation of the input shaft so that the cutting tool which has been brought into cutting position may remain in the same cutting position. In other words, when the cam follower is in engagement with the dwell portion, the output shaft is secured firmly at the desired position without any locking means such as a curvic coupling, gear coupling or the like.

The input shaft is driven by a motor having speed control, and when during machining the cam follower is in engagement with the dwell portion, the motor comes to rest.

However, in the indexing device of the type described, if an excessive load such as an impact is unexpectedly applied to one of the input and output shafts when the cam follower is in engagement with the dwell portion of the taper rib, the excessive load acts on the interface between the taper rib and the cam follower, which may cause permanent deformation such as an imprint caused by a pressure on the contact surfaces, or a warp in the cam follower; as a result the indexing device can not attain the desired accuracy by the permanent deformations.

SUMMARY OF THE INVENTION

An object of the present invention is to provide an indexing device which has a high rigidity and durability so that no imprint or warp will be generated in the taper rib and the cam follower even if excessive loads may be applied to the input or output shaft.

The present invention proposes an indexing device comprising: a rotatably driven input shaft; a globoidal cam provided on the input shaft and having, for the purpose of outputting intermittently the rotation of the input shaft, a taper rib defining a cam face which has a disk-shaped end face gradually yielding to a helical face about the input shaft; an output shaft to which the rotation of the input shaft is transmitted so that the output shaft may rotate intermittently; an indexing disk provided on the output shaft and having supports protruding radially outwardly at intervals along the circumference of the indexing disk, the ridge of the taper rib fitting between the adjoining supports; cam followers each disposed at the end of each support on the indexing disk and brought into engagement with the taper rib so as to be intermittently driven along the cam face; and gaps provided between the ridge of the taper rib and the supports opposite this, the gap being filled up by the elastic deformation of the cam follower so that the ridge of the taper rib may come into contact with the support. The present invention further proposes an indexing device comprising a housing; an input shaft and an output shaft both rotatably mounted in the housing and disposed at right angles to each other; a globoidal cam accommodated in the housing and disposed on the input shaft; a taper rib formed on the globoidal cam; an indexing disk accommodated in the housing, disposed on the output shaft and having supports rectangular in cross section protruding radially outwardly at intervals along the circumference of the indexing disk; cam followers each mounted on the support of the indexing disk, the lateral side of the taper rib fitting between the adjoining cam followers; recesses defined between the supports of the indexing disk and receiving the ridge of the taper rib; and minute gaps defined between the lateral sides of the taper rib and the lateral walls of the recesses in contact with the taper rib, the gap being filled up by the elastic deformation of the cam follower due to a load acting on the interface between the cam follower and the taper rib so that the lateral wall of the recess may come into contact with the lateral side of the taper rib. In the thus constituted device, when an excessive load is applied to the input shaft or the output shaft so that a large impact acts on the interface between the taper rib of the globoidal cam and the cam follower, the cam follower undergoes an elastic deformation; and when this elastic deformation exceeds the gap mentioned above, the lateral wall of the support (or recess) of the indexing disk comes into contact with the lateral side of the ridge of the taper rib. Therefore, the excessive stress is dispersed through the contact surfaces, which prevents the cam follower from undergoing a permanent deformation, and reduces generation of the imprint in the contact surfaces. Accordingly, the present device can reduce frictional loss of power during normal operations and increase impact resistance in case of emergency, and can attain improvements in rigidity and durability.

The present invention further proposes an indexing device for a machine tool having a turret to the circumference of which plural cutting tools are fastened so that a desired cutting tool can be brought and secured into cutting position, the indexing device comprising: a housing mounted on the bed of the machine tool and movable horizontally in the longitudinal and transverse directions; an input shaft rotatably mounted in this housing to be rotatably driven; a globoidal cam provided on the input shaft and having, in order to output intermittently the rotation of the input shaft, a taper rib defining a cam face which has a disk-shaped end face gradually yielding to a helical face about the input shaft; an output shaft rotatably mounted in the housing and adapted to receive the rotation of the input shaft so as to intermittently to rotate the turret mounted at the end of the output shaft; an indexing disk mounted on the output shaft and having supports protruding radially outwardly at intervals along the circumference of the indexing disk, the ridge of the taper rib fitting between the adjoining supports; cam followers each provided at the end of each support of the indexing disk and brought into engagement with the taper rib so as to be intermittently driven in the direction of the cam face; and gaps defined between the ridge of the taper rib and the supports opposite this, the gap being filled up by the elastic deformation of the cam follower in engagement with the taper rib so that the support may come into contact with the taper rib. In the thus constituted indexing device for cutting tools, when an excessive load is applied to the input shaft or the output shaft so that a large impact acts on the interface between the taper rib of the globoidal cam and the cam follower, the cam follower undergoes an elastic deformation; and when this elastic deformation exceeds the gap mentioned above, the lateral wall of the support of the indexing disk comes into contact with the lateral side of the ridge of the taper rib. Therefore, the excessive stress is dispersed through the contact surfaces so that the present indexing device for cutting tools can reduce frictional loss of power during normal operations and increase impact resistance in case of emergency, and can attain improvements in rigidity and durability.

Other objects, features and advantages of the invention will be apparent from the following detailed description thereof when taken in conjunction with the accompanying drawings.

DETAILED DESCRIPTION OF THE INVENTION

Figure 1:
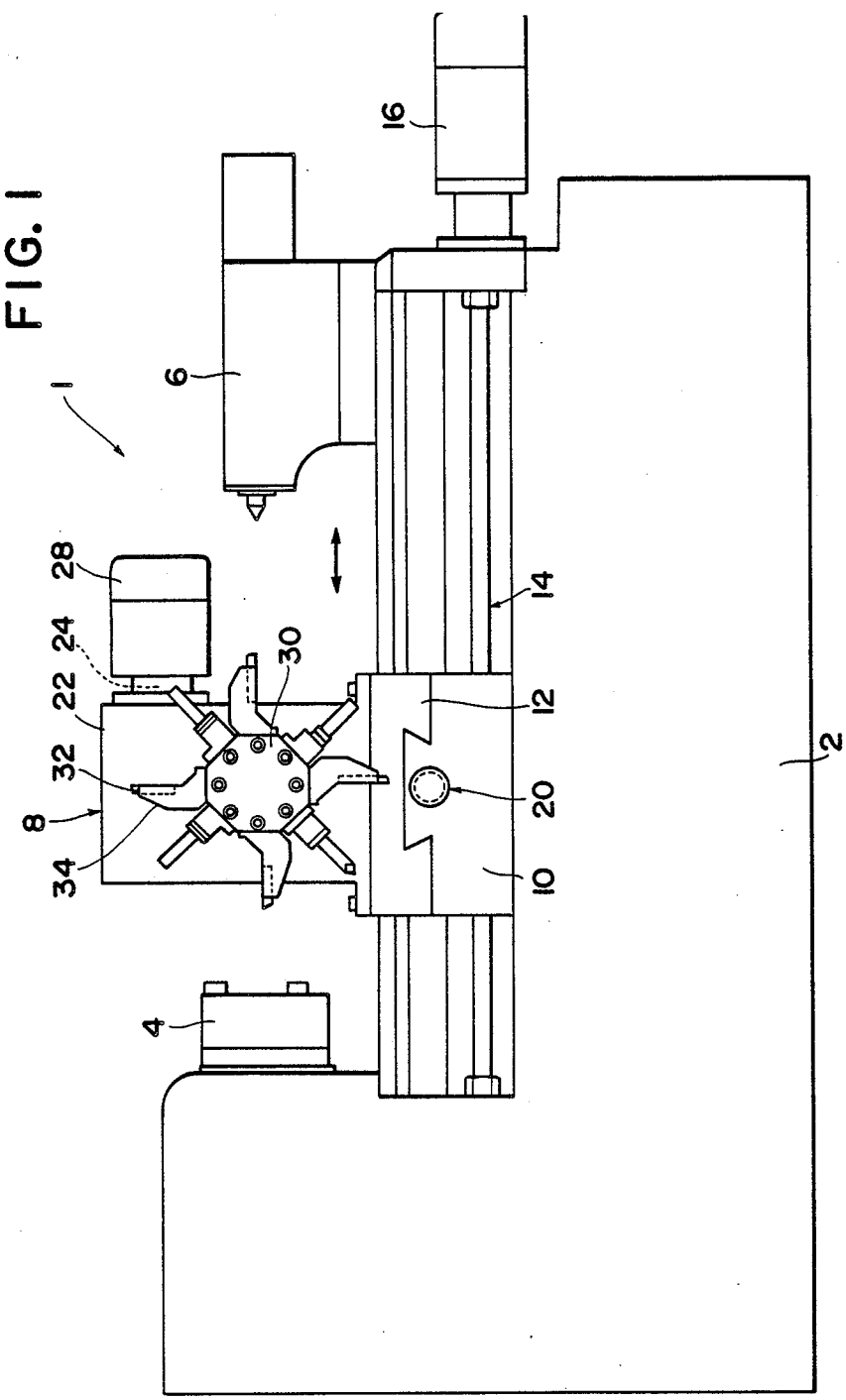
FIG. 1 is a front elevation of a machine tool which comprises an indexing device of the present invention.
Figure 2:
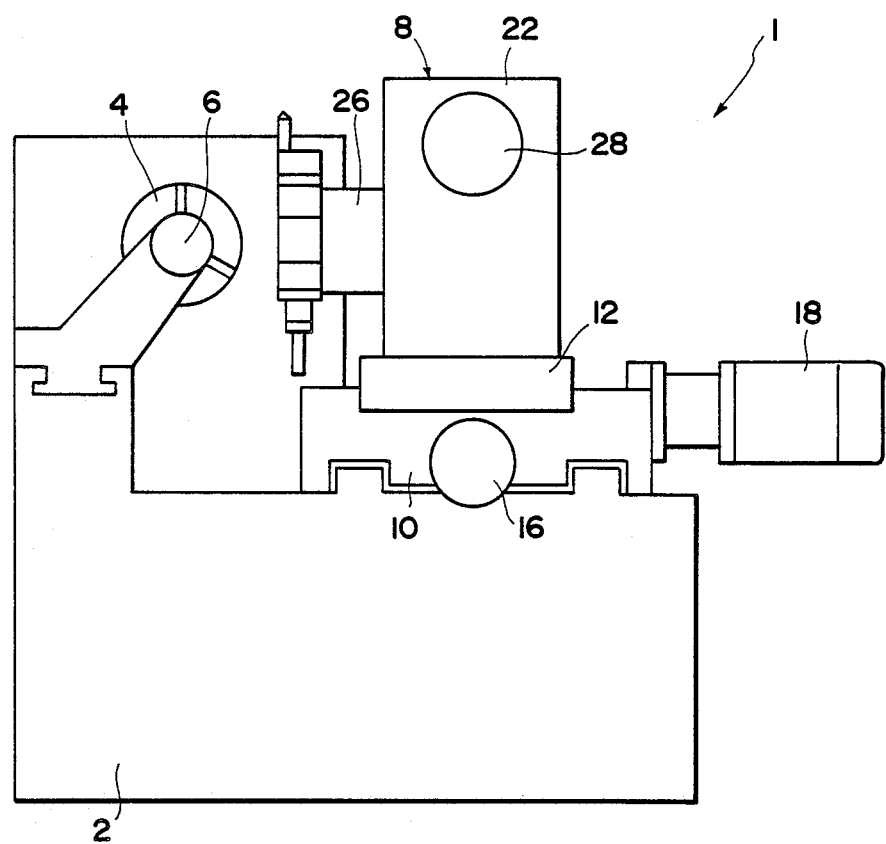
FIG. 2 is a side elevation of the machine tool of FIG. 1.
Figure 3:
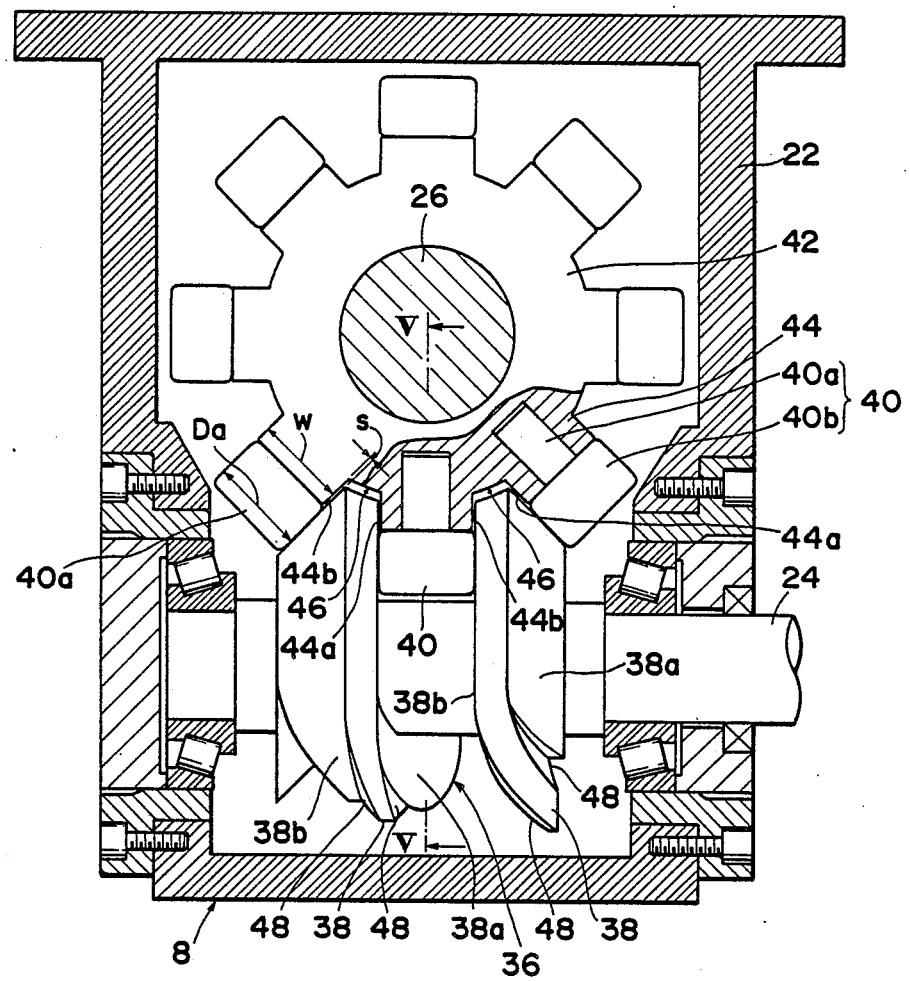
FIG. 3 is a sectional view of the indexing device with its housing and a partially broken indexing disk.
Figure 4:
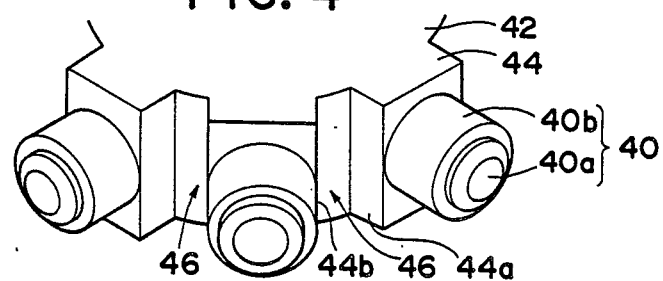
FIG. 4 is a perspective view of the indexing disk as shown in FIG. 3.
Figure 5:
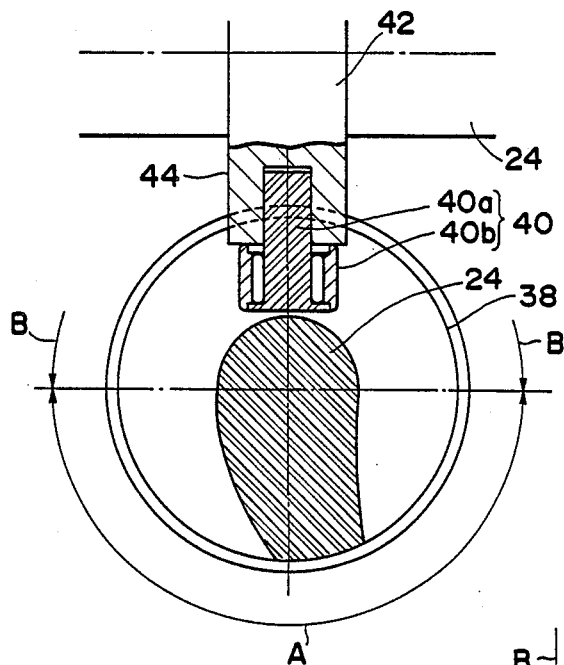
FIG. 5 is a sectional view along V—V line of FIG. 3.
Figure 6:
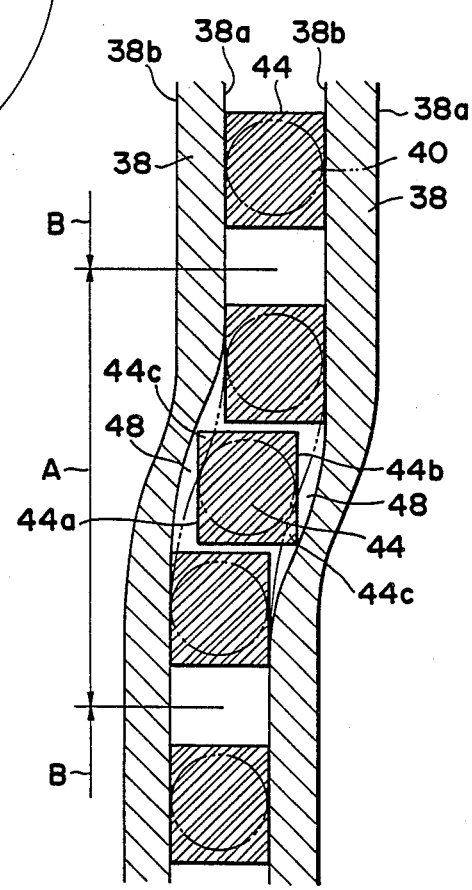
FIG. 6 is a development of a taper rib on a globoidal cam.

Referring first to FIGS. 1 and 2 of the drawings, a machine tool 1 comprises a bed 2 to which are attached a chuck 4 for holding a workpiece, a center 6, and an indexing device 8.

The indexing device 8 is disposed on two slides 10 and 12. One of the slides, namely, the lower slide 10 can slide on the bed 2 longitudinally in the axial direction of the chuck 4 and the center 6, and is driven and controlled by a known feed screw mechanism 14 supported on the bed 2. To the feed screw mechanism 14 is attached a motor 16 equipped with a control system for the feed screw mechanism 14.

The other of the slides or the upper slide 12, disposed on the lower slide 10, can slide transversely or in the direction at right angles to the direction of movement of the lower slide 10, and is also driven and controlled by a feed screw mechanism 20 attached to a motor 18 which is equipped with a control system for the feed screw mechanism 20.

On the upper slide 12 is fixed a housing 22 supporting rotatably an input shaft 24 and an output shaft 26 which extend at right angles to each other. The input shaft 24 is connected to a motor 28 with speed control which is fixed outside the housing 22. On the other hand, the output shaft 26 is connected to a turret 30 to the outer periphery of which a variety of cutting tools 32 are removably fastened via holders 34 and radially at prescribed intervals.

Referring to FIGS. 3 to 6, in the housing 22, a globoidal cam 36 is formed integrally with the input shaft 24, and a taper rib 38 of this globoidal cam 36 engages with cam followers 40.

These cam followers 40 are fixed radially at prescribed intervals along the outer periphery of an indexing disk 42 integral with the output shaft 26, the two cam followers immediately adjoining the cam follower in engagement with the cam 36 abut against the right and left lateral sides 38a and 38b of the taper rib 38 respectively. Each cam follower 40 consists of an axle 40a which is securely implanted in the outer periphery of the indexing disk 42, and a roller 40b rotatably supported on this axle 40a.

The taper rib 38, winding around the axle of the cam 36 so as to be helical in form, defines a cam face having an index portion A and a dwell portion B. The taper rib 38 includes a disk-shaped end face in the dwell portion B which is configured to produce no displacement in the direction of the input shaft 24 in response to the rotation of the input shaft 24 so that, when the cam follower 40 is in engagement with the taper rib 38 at the dwell portion B, the output shaft 26 does not rotate despite the rotation of the input shaft 24. Therefore, when the cam follower 40 is in engagement with the taper rib 38 at the dwell portion B, the cutting tool 32 which has been brought into cutting position remains in the same cutting position.

The taper rib 38 includes a helical face in the index portion A which adjoins the disk-shaped end face and is configured to produce a displacement in the direction of the input shaft 24 in response to an angle of rotation of the input shaft 24, and when the cam follower 40 is in engagement with the taper rib 38 at the index portion A, the output shaft 26 rotates a predetermined angle in response to the rotation of the input shaft 24. In other words, the desired cutting tool 32 fastened to the turret 30 can be brought and secured into cutting position by predetermined rotations of the input shaft 24.

Supports 44 of the indexing disk 42 for securing and supporting the cam follower 40 extend radially from the output shaft 26 so as to form protrusion having a rectangular-shaped cross section, and between the supports 44 are defined recesses 46 into which fits the ridge of the taper rib 38. The support 44 has a width w slightly less than the diameter Da of the roller 40b of the cam follower 40, and when the cam follower 40 is in engagement with the taper rib 38 at the dwell portion B, the lateral wall 44a or 44b of the support 44 of the cam follower 40 immediately adjoining the cam follower 40 in engagement is adapted to be spaced a minute gap s from the lateral side 38a or 38b of the ridge of the taper rib 38. The gap s is determined to be within the elastic deformation of the cam follower 40 generated by the load acting in the tangential direction of the indexing disk 42, and therefore, when an excessive load which would deform the cam follower 40 beyond its elastic limit acts on the interface between the cam follower 40 and the taper rib 38, the lateral walls 44a and 44b of the supports 44 come into surface contact with the lateral sides 38a and 38b of the taper rib 38 before the cam follower 40 undergoes a permanent deformation so that the excessive load may be dispersed between the cam follower 40 and the taper rib 38 through the contact surfaces.

On the other hand, when the supports 44 rectangular in cross section protrude with the taper rib 38 fitting into the recesses 46 between the supports 44 as described above, the corners 44c of the support 44 in the index portion A interferes with the lateral sides 38a and 38b of the taper rib 38. Therefore, the lateral sides 38a and 38b in the index portion A are provided with cutouts 48 as shown in the drawings to avoid the interference.

Accordingly, in the indexing device 8 thus constituted, when the cam follower 40 is in engagement with the taper rib 38 at the index portion A, the output shaft 26 rotates a predetermined angle in response to the rotation of the input shaft 24. And when the cam follower 40 is in engagement with the taper rib 38 at the dwell portion B, the output shaft 26 does not rotate despite the rotation of the input shaft 24, and therefore the cutting tool 32 which has been brought into cutting position remains in the same cutting position. In order to maintain the cutting tool in cutting position for a longer time, the rotation of the input shaft 24 can be stopped while the cam follower 40 is in engagement with the taper rib 38 at the dwell portion B. In addition, by controlling the number of rotation of the input shaft 24, a desired cutting tool 32 can be brought into cutting position.

If an excessive load such as an impact is unexpectedly applied to the input shaft 24 or the output shaft 26 when the cam follower is in engagement with the dwell portion B, the excessive load acts on the contact surfaces of the taper rib 38 of the globoidal cam 36 and the cam follower 40 of the indexing disk 42, and the cam follower 40 first undergoes an elastic deformation. And when this elastic deformation exceeds a gap s provided between the lateral walls 44a and 44b of the supports 44 and the lateral sides 38a and 38b of the taper rib 38, the lateral walls 44a and 44b of the supports 44 come into surface contact with the lateral sides 38a and 38b of the taper rib 38 so that the excessive load acting on the contact surfaces of the taper rib 38 and the cam follower 40 is dispersed through the contact surfaces of the lateral walls 44a and 44b of the supports 44 and of the lateral sides 38i and 38b of the taper rib 38.

Accordingly, generation of permanent deformation such as an imprint in the contact surfaces of the lateral sides 38a and 38b of the taper rib 38 and the rollers 40b, and a warp in the axle 40a of the cam follower 40 can be prevented. Thus the indexing device of the present invention can attain improvements in rigidity and durability.

Figure 7:
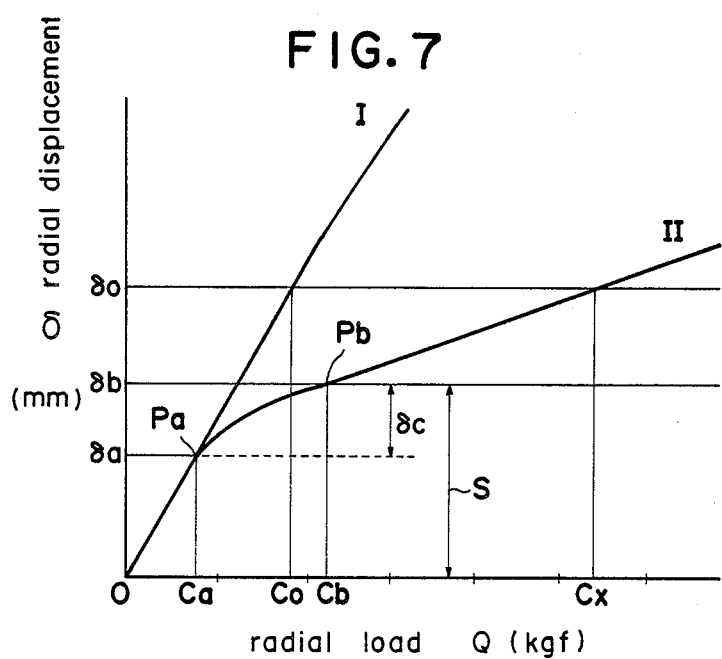
FIG. 7 is a graph showing a relation between a radial load applied to a cam follower and its radial displacement.

FIG. 7 is a graph showing a relation between a radial load Q acting on the cam follower and a radial displacement $\delta$ of the cam follower; line I is obtained from experiments on a conventional indexing device, and line II, the above-described indexing device of the present invention. When an excessive load is applied to two objects in contact, which load exceeds the elastic limit of the material of the objects, a permanent deformation is generated in the contact surfaces of the two objects; however, in the case of the cam follower described above, the permanent deformation within 0.01% of the diameter Da of the roller is usually insignificant, therefore permissible, in terms of its function. Referring to the graph, $\delta 0$ in the vertical axis shows the maximum permissible displacement of the cam follower beyond which there remains a permanent deformation over the 0.01% limit; therefore, as shown in line I the conventional indexing device can stand the load up to C0 (basic static load rating) on the horizontal axis.

On the other hand, in the indexing device of the present invention (line II), when the displacement of the cam follower 40 exceeds the gap s, the lateral walls 44a and 44b of the supports 44 come into contact with the lateral sides 38a and 38b of the ridge of the taper rib 38 so that the load is dispersed through the interface between them; as a result after the contact the rate of increase of the displacement relative to the increase of the load declines so that the load Cx which produces the displacement $\delta 0$ of the cam follower 40 is several times as large as the corresponding load C0 for the conventional device, whereby the indexing device of the present invention can attain, so to speak, a high rigidity. The curved part, Pa to Pb, shows that extreme-pressure lubrication is produced between the lateral walls 44a and 44b of the supports 44 and the lateral sides 38a and 38b of the ridge of the taper rib 38, and during this part the gap s decreases to less than the threshold $\delta c$ for producing fluid lubrication Ca represents the radial load needed to cause radial displacement Pa and Cb represents the radial load needed to cause radial displacement Pb.

In other words, the gap s can take any amount between the threshold $\delta c$ for fluid lubrication and the permissible maximum value $\delta 0$ ($\delta c < s < \delta 0$); however, in order to keep frictional loss as low as possible during normal operations and at the same time to increase impact resistance in case of emergency, it is more preferable that the gap s be as small as possible within the range where lubrication between the lateral walls 44a and 44b of the supports 44 and the lateral sides 38a and 38b of the taper rib 38 can be maintained in the fluid lubrication.

Figure 8:
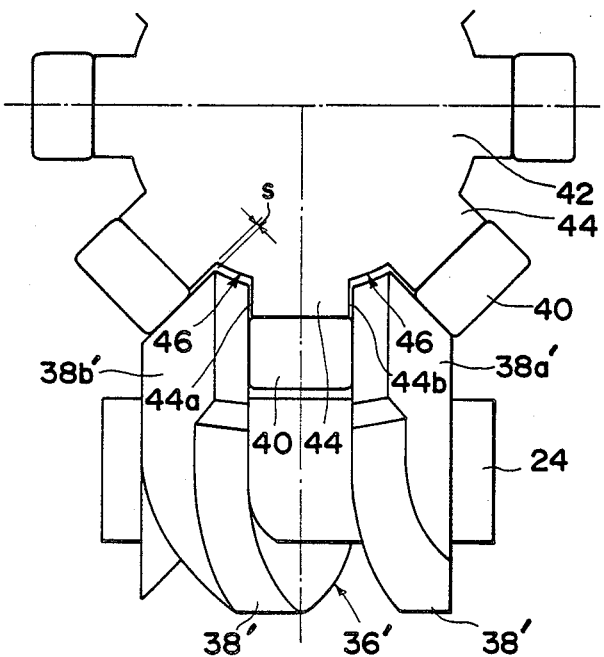
FIGS. 8 to 10 show an indexing device according to a second embodiment of the present invention, and are views similar to FIGS. 3, 5 and 6, respectively.
Figure 9:
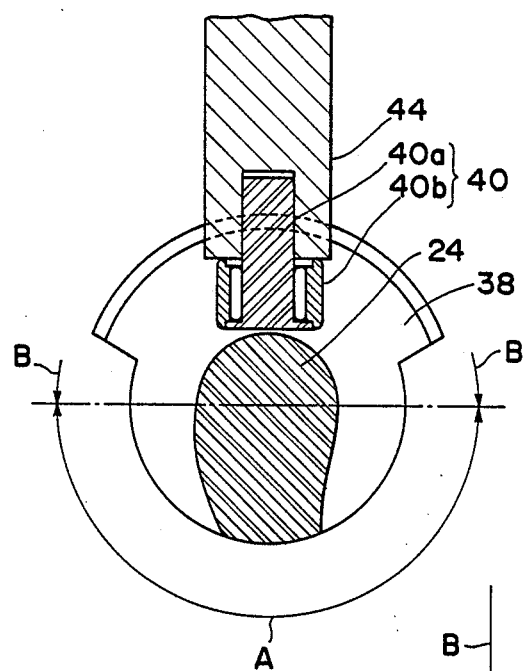
Figure 10:
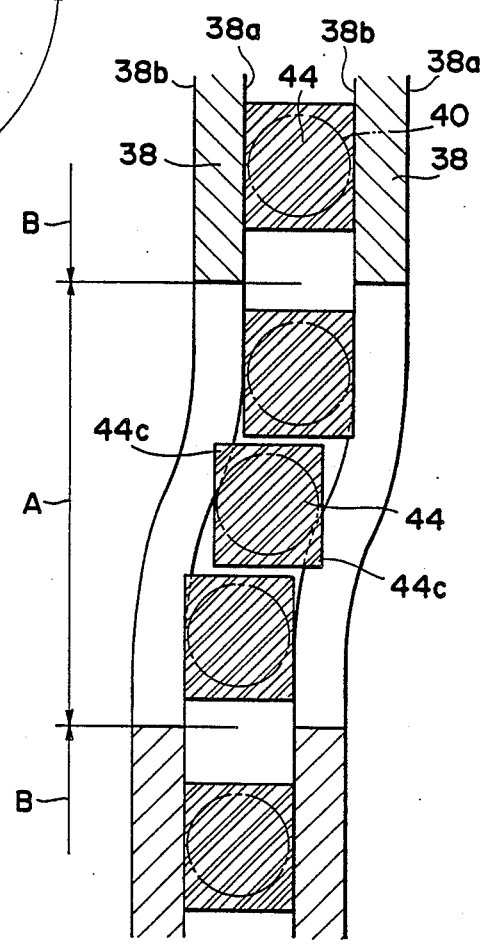

FIGS. 8 to 10 show the second embodiment of the present invention. In this embodiment, only in the dwell portion B the ridge of the taper rib 38' of cam 36' fits into the recesses 46 between the supports 44 of the indexing disk 42, and the ridge of the taper rib 38' in the indexing portion A is cut away so that the corners 44c of the supports 44 may not interfere with the lateral sides 38a' and 38b' of the taper rib 38'.

Figure 11:
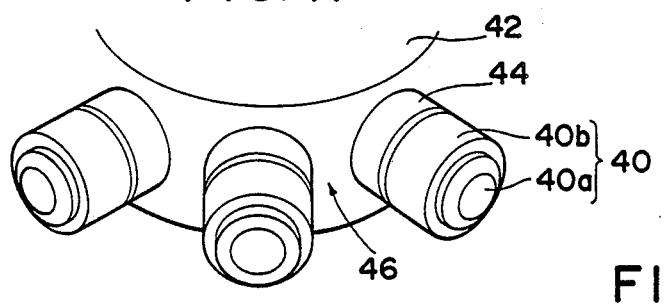
FIGS. 11 and 12 show an indexing device according to a third embodiment of the present invention, and are views similar to FIGS. 4 and 6.
Figure 12:
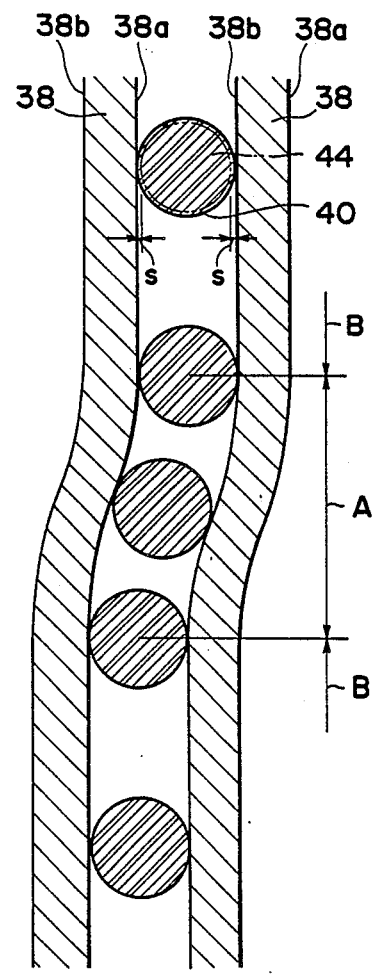

FIGS. 11 and 12 show the third embodiment of the present invention. In this embodiment, the supports 44 of the indexing disk 42 have a circular cross section. And the diameter of the support 44 is slightly less than the diameter Da of the roller 40b, and is spaced by the gap s from the lateral sides 38a'' and 38b'' of the ridge of the taper rib 38''. Therefore, in this third embodiment, the supports 44 do not interfere with the taper rib 38'' in the indexing portion A without the provision of cutouts or clearance grooves for the purpose of avoiding the interference.

What is claimed is:

1. An indexing device comprising:
   a rotatably driven input shaft;
   a globoidal cam provided on the input shaft and having, for the purpose of outputting intermittently the rotation of the input shaft, a taper rib defining a cam face which has a disk-shaped end face gradually yielding to a helical face about the input shaft;
   an output shaft to which the rotation of the input shaft is transmitted so that the output shaft may rotate intermittently;
   an indexing disk provided on the output shaft and having supports protruding radially outwardly at intervals along the circumference of the indexing disk, the taper rib having a ridge fitting between the adjoining supports;
   cam followers each disposed at the end of each support on the indexing disk and brought into engagement with the taper rib so as to be intermittently driven along the cam face; and
   gaps provided between the ridge of the taper rib and the supports opposite this, the gap being filled up by the elastic deformation of the cam follower so that the ridge of the taper rib may come into contact with the support.

2. An indexing device for a machine tool having a turret to the circumference of which plural cutting tools are fastened so that a desired cutting tool can be brought and secured into cutting position, the indexing device comprising:
   a housing mounted on the bed of the machine tool and movable horizontally in the longitudinal and transverse directions;
   an input shaft rotatably mounted in this housing to be rotatably driven;
   a globoidal cam provided on the input shaft and having, in order to output intermittently the rotation of the input shaft, a taper rib defining a cam face which has a disk-shaped end face gradually yielding to a helical face about the input shaft;
   an output shaft rotatably mounted in the housing and adapted to receive the rotation of the input shaft so as to intermittently rotate the turret mounted at the end of the output shaft;
   an indexing disk mounted on the output shaft and having supports protruding radially outwardly at intervals along the circumference of the indexing disk, the taper rib including a ridge fitting between the adjoining supports;
   cam followers each provided at the end of each support of the indexing disk and brought into engagement with the taper rib so as to be intermittently driven in the direction of the cam face; and
   gaps defined between the ridge of the taper rib and the supports opposite this, the gap being filled up by the elastic deformation of the cam follower in engagement with the taper rib so that the support may come into contact with the taper rib.

3. An indexing device comprising:
   a housing;
   an input shaft and an output shaft both rotatably mounted in the housing and disposed at right angles to each other;
   a globoidal cam accommodated in the housing and disposed on the input shaft;
   a taper rib formed on the globoidal cam;
   an indexing disk accommodated in the housing, disposed on the output shaft and having supports rectangular in cross section protruding radially outwardly at intervals along the circumference of the indexing disk;
   cam followers each mounted on the support of the indexing disk, the taper rib including a ridge and lateral sides fitting between the adjoining cam followers;
   recesses defined between the supports of the indexing disk and receiving the ridge of the taper rib; and
   minute gaps defined between the lateral sides of the taper rib and the lateral walls of the recesses in contact with the taper rib, the gap being filled up by the elastic deformation of the cam follower due to a load acting on the interface between the cam follower and the taper rib so that the lateral wall of the recess may come into contact with the lateral side of the taper rib.

4. An indexing device as claimed in claim 3 wherein the taper rib on the globoidal cam is helical in form to have an index portion and a dwell portion; in the index portion the cam undergoes a displacement in the direction of the input shaft in response to an angle of rotation of the input shaft so that, when the cam follower is in engagement with the index portion, the output shaft rotates in response to the angle of rotation of the input shaft; and in the dwell portion the cam undergoes no displacement in the direction of the input shaft in response to the rotation of the input shaft so that, when the cam follower is in engagement with the dwell portion, the output shaft does not rotate despite the rotation of the input shaft.

5. An indexing device as claimed in claim 4 wherein parts of the lateral side of the taper rib in the index portion is cut away in the form of a groove in order to avoid interfering with the corners of the support.

6. An indexing device as claimed in claim 4 wherein the ridge of he taper rib in the index portion is cut away so that it may not fit into the recess between the supports.

7. An indexing device as claimed in claim 3 wherein each cam follower comprises an axle securely mounted in the circumference of the indexing disk, and a roller rotatably supported on this axle.

8. An indexing device as claimed in claim 7 wherein the supports have a width slightly less than the diameter of the roller of the cam follower; minute gaps are provided between the lateral walls of the recesses and the lateral sides of the ridge of the taper rib when the roller comes into contact with the lateral sides of the ridge of the taper rib in the dwell portion; and if an excessive load is applied to one of the input and output shafts and therefore acts on the interface between the taper rib and the cam follower when the cam follower is in engagement with the dwell portion, the elastic deformation of the cam follower becomes larger than the gap so that the lateral wall of the recess comes into face contact with the lateral side of the taper rib, thus dispersing the excessive load between the contact surfaces.

9. An indexing device as claimed in claim 7 wherein the supports of the indexing disk have a circular cross section whose diameter is slightly less than the diameter of the roller in order to define gaps between the lateral wall of the roller and the lateral side of the ridge of the taper rib.

* * * * *